UNITED STATES PATENT OFFICE.

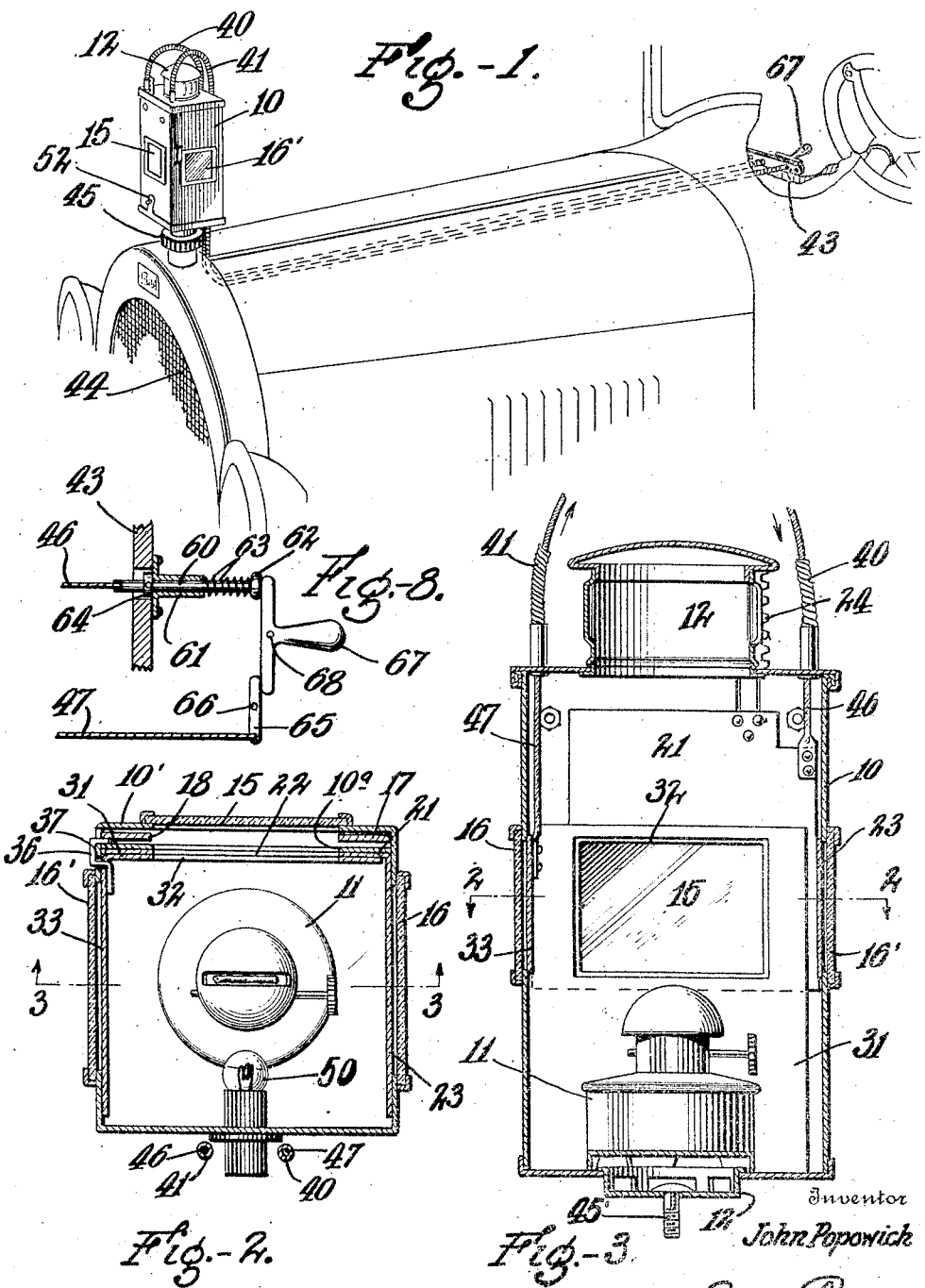

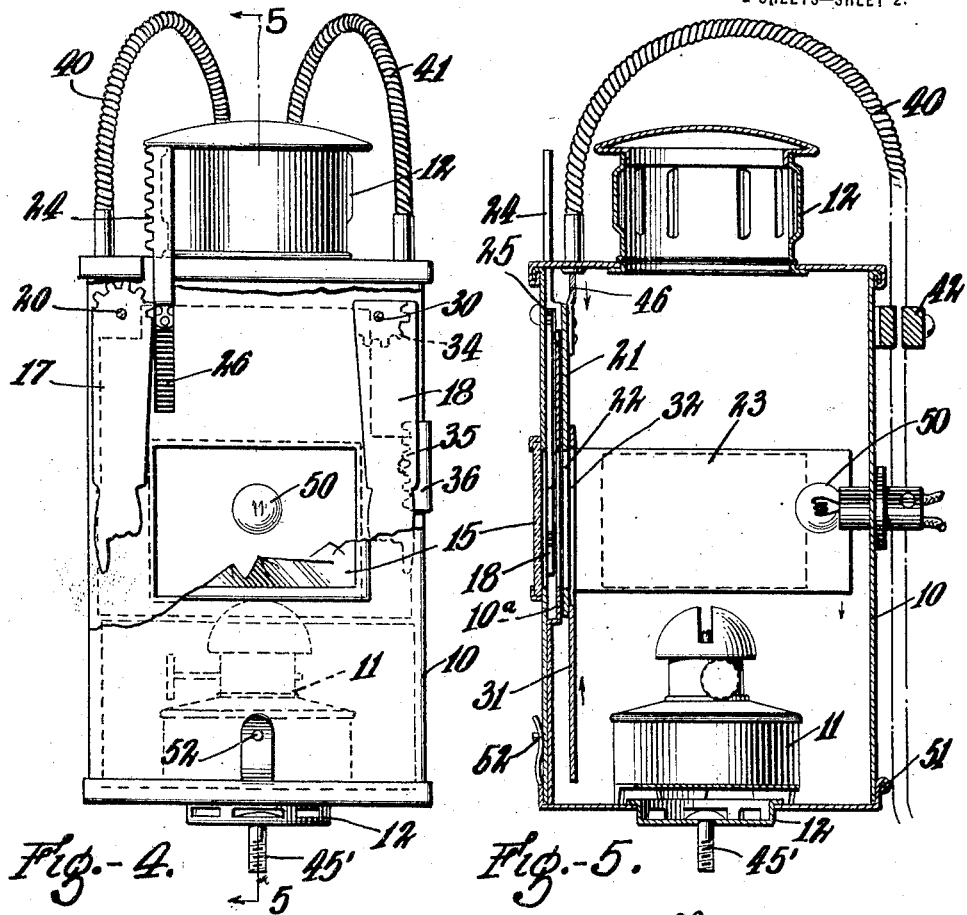
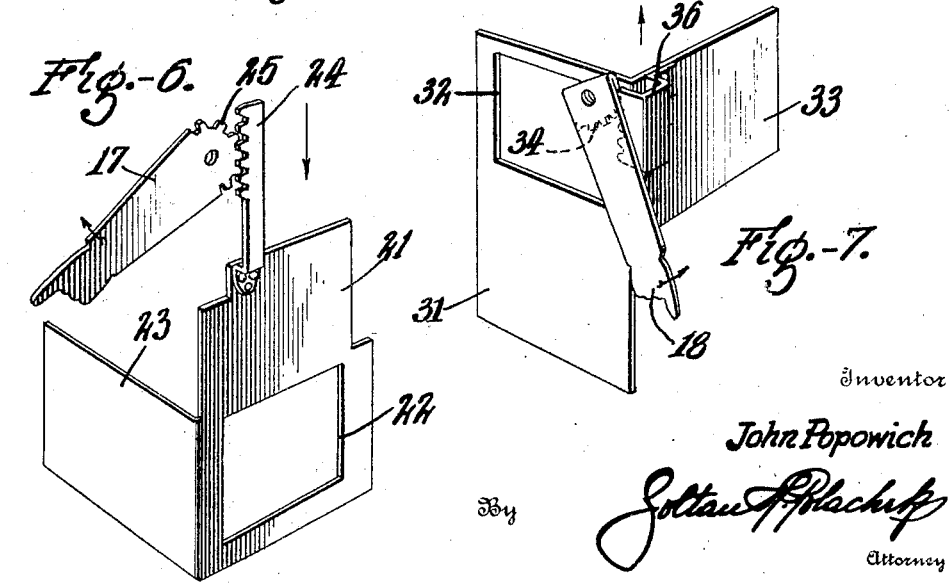

JOHN POPOWICH, OF PASSAIC, NEW JERSEY.

VEHICLE-SIGNAL.

1,379,211. Specification of Letters Patent. Patented May 24, 1921.

Application filed January 3, 1921. Serial No. 434,481.

*To all whom it may concern:*

Be it known that I, JOHN POPOWICH, citizen of Czecho-Slovakia, residing at Passaic, in the county of Passaic and State of New Jersey, have invented certain new and useful Improvements in Vehicle-Signals, of which the following is a specification.

This invention relates to vehicle signals adapted to be carried upon automobiles or other vehicles to enable the driver to readily indicate to nearby vehicles his intention to turn in either direction.

The invention has for an object to provide a device of this kind of simple and inexpensive construction and which may be easily manipulated by the driver of the vehicle.

For further comprehension of the invention, and of the objects and advantages thereof, reference will be had to the following description and accompanying drawings, and to the appended claims in which the various novel features of the invention are more particularly set forth.

Figure 1 of the drawings is a fragmentary perspective view of an automobile having the invention applied thereto.

Fig. 2 is a horizontal sectional view of the signal element, this view being taken on the line 2—2 of Fig. 3.

Fig. 3 is a vertical sectional view of the signal element taken on the line 3—3 of Fig. 2.

Fig. 4 is a front elevation thereof with certain parts broken away.

Fig. 5 is a vertical section on the line 5—5 of Fig. 4.

Fig. 6 is a detail perspective view of one of the indicating devices.

Fig. 7 is a similar view of the other indicating device.

Fig. 8 is a detail view of the operating handle and the parts engaged thereby.

Referring now to the drawings my improved signal comprises a casing 10 which may be of rectangular shape in plan view with parallel side walls. Within this casing I preferably mount an oil lamp 11, consisting of the usual burner and reservoir, an apertured depression 12 being formed in the bottom of the casing and apertured cupola 12 in the top for air circulation.

Formed in the front wall of the casing is a glass covered aperture 15, similar apertures 16 and 16′ being formed in the side walls of the casing. The front wall of the casing is formed double and the two elements 10′ and 10ª are spaced from one another, as shown most clearly in Fig. 4, to accommodate the signal arms 17 and 18 when the latter are in inoperative position, the space between these two wall elements being left open at the sides to permit of the arms swinging outwardly.

The signal arm 17 indicates a turn to the right when raised to operative position and as here shown is pivoted at one end on a pin 20 fixed in the wall elements 10′ and 10ª. Coöperating with this signal arm is a shutter element which is adapted to close the aperture 15 in the front wall of the casing and open the aperture 16 on the right side. This shutter element is illustrated in detail in Fig. 6 and comprises a front plate 21, the lower half whereof is formed with an aperture 22 corresponding to the aperture 15 in the front wall of the casing, the plate 21 having a right angled offset 22 corresponding in vertical positioning to the aperture 16. Secured to the top edge of this plate 21, and extending upwardly therefrom is a rack-bar 24 the teeth whereof are adapted to mesh with a gear sector 25 on the pivoted end of the signal arm 17. As previously stated, the signal arms are located between the two elements of the front wall. The shutter member just described is located entirely within the casing with its plate 21 adjacent the inner wall element 10ª and to permit of engagement of the rack 24 with the gear sector 25 the former is offset forwardly from the plate 21 while the wall element is vertically slotted as at 26 to receive the inturned foot of the rack-bar which is fastened to the plate.

The signal arm 18 is arranged to indicate a turn to the left and it is pivoted on a pin 30 carried by the wall elements 10′ and 10ª. Coöperating with this signal arm is a shutter element adapted, when the arm is moved to operative position, to close the aperture 15 in the front wall and open the aperture 16′ on the left side. This shutter element comprises a plate 31 which is disposed inwardly of the plate 21 and has in its upper half an aperture 32 corresponding to the aperture 15 in the front wall of the casing, the plate having at its upper portion a right angled offset 33 which normally covers the aperture 16′. Formed on the arm 18, and facing toward the outer end thereof, is a gear sector 34 which meshes with a rack face 35 on a U-bracket 36 fixed to the offset 33, the side wall of the casing being vertically slotted as at 37 (Fig. 2) to receive this bracket 36 which outwardly projects through the slot and has its rack face turned inwardly between the front wall elements 10' and 10ª. As will be apparent from the above description, a downward movement of plate 21 will raise the arm 17 while an upward movement of the plate 31 will raise the arm 18.

The shutter plates 21 and 31 are operated by the following means: Leading into the top of the casing 10 are a pair of tubes 40, 41 which are curved downwardly along the back of the casing to which they may be attached by the cleat 42, and then rearwardly to the dash-board 43 of the automobile, the signal device being preferably mounted on top of the radiator 44. The cap 45 of the latter may have a threaded socket to receive a screw 45' projecting fixedly downward from the bottom of the casing 10. Through the tubes 40, 41 are led a pair of cords or wires 46 and 47 which are fastened at one end to the respective plates 21 and 31 and at their opposite ends to a control device mounted on the dash-board of the automobile. While I have shown the tubes 40, 41 as made of twisted wire it is to be understood that they are of sufficient rigidity to properly guide the cords 46, 47. In the rear wall of the casing 10 I may mount an electric lamp 50, the oil burner 11 being used when there is not sufficient current for the lamp. For access to the interior of the casing the bottom of the latter is preferably hinged at one side as at 51, its opposite side being held by a snap fastener 52.

In the normal position of the various parts the arms 17 and 18 hang down between the wall elements 10' and 10ª at the sides thereof as shown in Fig. 4. The shutter plates 21 and 31 are each in position with their apertures registering with the opening 15 in the front wall while their offsets 23 and 33 close the openings 16 and 16' in the side walls, cord 46 holding the plate 21 raised. When cord 46 is released the shutter plate 21 falls of its own weight and closes the opening 15 in the front wall and opens the one 16, in the right side wall. At the same time the engagement of rack bar 24 with the sector 25 on arm 17 swings the latter up to horizontal position projecting laterally from the casing. If cord 47 is pulled, shutter plate 31 is raised, the aperture in the front wall is closed, the one, 16', in the left side wall is opened, and arm 18 is swung outward.

To enable the right and left turn signals to be conveniently operated I preferably provide the control arrangement shown in Fig. 8. As there shown the cord 46 connects to a plunger rod 60 slidable in a sleeve 61 fixed to the dash-board 43 and having a head 62 between which and the sleeve an expansion spring 63 bears a collar 64 limiting movement of the plunger. The cord 47 is attached to one end of a rocking lever 65 pivoted between its ends as at 66, while a T-shaped operating handle 67 pivoted as at 68, projects into engaging position with the plunger rod and lever. By moving the handle in one direction the shutter plate 21 is allowed to drop, while by moving it in an opposite direction the cord 47 is pulled and the shutter plate 31 raised.

Having thus described my invention what I claim as new and desire to protect by Letters Patent of the United States is as follows:

1. A signal device for vehicles comprising a casing having apertures in its front and side walls, a lamp in said casing, a pair of shutter plates vertically slidable adjacent the front wall of the casing, said plates having apertures formed therein and registering with the aperture in the front wall of the casing when the plates are in normal position, angular offsets on said plates registering with the apertures in the side wall of the casing when the plates are in normal position, a pair of signal arms normally concealed by the casing, and means whereby corresponding ones of said signal arms and plates may be moved in unison to operative position with the front aperture covered and the side aperture uncovered.

2. A signal device for vehicles comprising a casing having apertures in its front and side walls, a lamp in said casing, a pair of shutter plates vertically slidable adjacent the front wall of the casing, said plates having apertures formed therein and registering with the aperture in the front wall of the casing when the plates are in normal position, angular offsets on said plates registering with the apertures in the side wall of the casing when the plates are in normal position, a pair of signal arms normally concealed by the casing, and means whereby corresponding ones of said signal arms and plates may be moved in unison to operative position with the front aperture covered and the side aperture uncovered, said means including rack elements carried by the shutter plates, and gear sections carried by the said arms.

3. A signal device for vehicles comprising a casing having apertures in its front and side walls, a lamp in said casing, a pair of shutter plates vertically slidable adjacent the front wall of the casing, said plates having apertures formed therein and registering with the aperture in the front wall of the casing when the plates are in normal position, angular offsets on said plates registering with the apertures in the side wall of the casing when the plates are in normal position, a pair of signal arms normally concealed by the casing, and means whereby corresponding ones of said signal arms and plates may be moved in unison to operative position with the front aperture covered and the side aperture uncovered, and said means including rack elements carried by the shutter plates, and gear sections carried by the said arms and a pair of cords connected to the respective shutter plates, and a common operating handle to which said cords are connected and adapted to operate said shutter plates independently of one another.

In testimony whereof I have affixed my signature.

JOHN POPOWICH.